US00RE47951E

(19) United States
(12) Reissued Patent
Sekine et al.

(10) Patent Number: US RE47,951 E
(45) Date of Reissued Patent: Apr. 14, 2020

(54) IMAGE PROCESSING APPARATUS

(71) Applicant: FUJI XEROX CO., LTD., Tokyo (JP)

(72) Inventors: Hiroshi Sekine, Ebina (JP); Hiroyuki Kawano, Ebina (JP); Takanobu Otsubo, Ebina (JP)

(73) Assignee: FUJI XEROX CO., LTD., Tokyo (JP)

(21) Appl. No.: 16/191,167

(22) Filed: Nov. 14, 2018

Related U.S. Patent Documents

Reissue of:
(64) Patent No.: 7,006,247
Issued: Feb. 28, 2006
Appl. No.: 09/716,958
Filed: Nov. 22, 2000

(30) Foreign Application Priority Data

May 2, 2000 (JP) ..... 2000-133635

(51) Int. Cl.
*G06K 15/00* (2006.01)
*H04N 1/387* (2006.01)

(52) U.S. Cl.
CPC ..... *H04N 1/3871* (2013.01)

(58) Field of Classification Search
CPC ..... H04N 1/3871
USPC ..... 358/1.9, 2.1, 3.3, 500, 515, 518, 529, 358/530; 382/162, 167, 165, 305; 715/274, 275
See application file for complete search history.

(56) References Cited

U.S. PATENT DOCUMENTS 5,117,284 A * 5/1992 Mori et al. ..... 358/529
5,293,539 A * 3/1994 Spence ..... H04N 1/52 358/406
5,440,408 A * 8/1995 Tomita ..... 358/468
5,781,663 A * 7/1998 Sakaguchi et al. ..... 382/189
5,806,078 A * 9/1998 Hug ..... G06F 17/2288 707/999.202
6,072,902 A * 6/2000 Myers ..... G06K 15/02 345/603
6,115,495 A * 9/2000 Tachikawa et al. ..... 382/165
6,263,173 B1 * 7/2001 Nakamura et al. ..... 399/82
(Continued)

FOREIGN PATENT DOCUMENTS

JP 11-192760 7/1999
JP H11-261798 A 9/1999
JP 020001309171 A * 11/2001

*Primary Examiner* — Joshua D Campbell
(74) *Attorney, Agent, or Firm* — Oliff PLC

(57) ABSTRACT

There is provided an image processing apparatus where in an additional image storage unit 3, a color additional image is stored into a color image storage unit 4, and a black/white additional image is stored into a black/white image storage unit 5. A color judging unit 2 judges as to whether an input image corresponds to a color image, or a black/white image every page thereof. Based upon the judgment result of the color judging unit 2, an image synthesizing unit 6 adds the color additional image stored in the color image storage unit 4 to the input image when the input image is the color image, and adds the black/white additional image stored in the black/white image storage unit 5 in the input image when the input image is the black/white image. Then, the image synthesizing unit 6 outputs the resulting image synthesized with the additional image. When the input image is the black/white image, the black/white additional image is added to this input image charge amount for the black/white image can be determined.

6 Claims, 9 Drawing Sheets

(56) References Cited

U.S. PATENT DOCUMENTS

| | | | | |
|---|---|---|---|---|
| 6,668,017 | B1 * | 12/2003 | Watanabe | 375/240.12 |
| 6,707,951 | B1 * | 3/2004 | Suzuki et al. | 382/260 |
| 6,727,999 | B1 * | 4/2004 | Takahashi | 358/1.15 |
| 6,757,428 | B1 * | 6/2004 | Lin et al. | 382/165 |
| 6,813,369 | B2 * | 11/2004 | Oki | 382/100 |
| 8,456,705 | B2 * | 6/2013 | Faber | G03G 15/5075 358/1.9 |
| 2002/0126316 | A1 * | 9/2002 | Sakaki et al. | 358/3.28 |
| 2003/0112470 | A1 * | 6/2003 | Sakaki et al. | 358/3.28 |
| 2003/0145279 | A1 * | 7/2003 | Bourbakis | G06F 16/958 715/256 |
| 2003/0237054 | A1 * | 12/2003 | Donahue | G06K 15/02 715/251 |
| 2004/0146105 | A1 * | 7/2004 | Hagai et al. | 375/240.12 |
| 2005/0262437 | A1 * | 11/2005 | Patterson | G06F 17/243 715/243 |

* cited by examiner

| INPUT IMAGE | CHARGE AMOUNT FOR DOCUMENT WITHOUT ADDITIONAL IMAGE | CHARGE AMOUNT FOR DOCUMENT WITH ADDITIONAL IMAGE |
|---|---|---|
| COLOR | CHARGE AMOUNT A | CHARGE AMOUNT B |
| BLACK/WHITE | CHARGE AMOUNT C | CHARGE AMOUNT D |

FIG. 4

IMAGE PROCESSING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a Reissue of U.S. Pat. No. 7,006,247, issued Feb. 28, 2006, which issued from U.S. application Ser. No. 09/716,958, filed Nov. 22, 2000, which claims priority to Japanese Patent Application No. 2000-133635, filed on May 2, 2000.*

BACKGROUND OF THE INVENTION

1. Field of the Invention

The present invention is related to an image processing apparatus which may be applied to various sorts of image output systems such as a facsimile, a copying machine, and a printer.

2. Description of the Related Art

Image output apparatuses known as facsimiles, copying machines, and printers are manufactured in composite forms by digitally combining various functions thereof. On the other hand, these image output apparatuses are gradually connectable to networks such as the Internet and an intranet. In addition, data transfer speeds via networks are gradually increased. On the other hand, while hard disks and semiconductor memories are manufactured in low cost and with large storage capacities, better environments may be established under which image data are distributed/stored in relatively easy manners. For instance, Japanese Laid-open Patent Application No. Hei-11-192760 discloses the following charge amount discounting method. That is, in this disclosed apparatus, with respect to the images outputted on the paper and also the images transmitted by using the networks and the FAX (facsimiles), the images such as advertisement information are added, so that the charge amounts for the users are discounted.

However, in the conventional technique described in the above-explained publication, since the images such as the advertisement information are uniformly added, there is such a possibility that when the image to be outputted by the user corresponds to the black/white image, the color image is added to this black/white image. Normally, there are differences in output speeds in the case that a color image is outputted, whereas a black/white image is outputted. As a consequence, if a color image is added to an input image although a user intends to output a black/white image, then an output speed is lowered due to the added color image. As a result, there is such a risk that productivity is considerably lowered.

Also, generally speaking, in a charging system for calculating a charge amount when an image is outputted, a charge amount shared by a user when a color image is outputted is different from a charge amount shared by the user when a black/white image is outputted. As a consequence, the following problem may occur. That is, even when an image which is outputted by a user corresponds to a black/white image, if an added image corresponds to a color image, then this charging system simply calculates a charge amount for the color image.

Furthermore, the following case may be conceived. In such an output apparatus capable of outputting only a black/white image after a color image has been added to an input image, only such a black/white image is merely outputted. In such a case, in accordance with the conventional technique described in the above-explained publication, the following problems may be conceived. That is, since the image formed for the color image is black/white-converted, certain colors are dropped out, and color differences cannot be discriminated from each other, so that the content of the image cannot be correctly informed.

SUMMARY OF THE INVENTION

The present invention has been made to solve the above-explained problems, and therefore, has an object to provide an image processing apparatus capable of adding an additional image to an input image in response to a characteristic of this input image, and capable of outputting an image without deteriorating productivity when an image is outputted, and also capable of avoiding dropping of a content of an additional image.

Another object of the present invention is to provide an image processing apparatus capable of calculating a charge amount in a proper manner even when a charge amount is calculated, and also even when an additional image is added.

An image processing apparatus, according to the present invention, is featured by comprising: additional image storage means for storing thereinto one, or more additional images in response to a characteristic of an input image; judging means for judging the characteristic of the input image; and synthesizing means for adding an additional image corresponding to the characteristic of the input image stored in the additional image storage means to the input image in accordance with the judgment result made by the judging means. For instance, while the additional image storage means stores thereinto both a color additional image and a black/white additional image, depending upon such a fact as to whether the input image corresponds to a color input image, or a black/white input image, the additional images to be added to the input image can be switched. As a result, when the input image is the black/white image, the black/white image can be added to this input image. This is different from the conventional image processing apparatus in which only the additional image is the color image, so that productivity is not lowered. Also, as to the image to be added, since the additional image corresponding to the black/white image is added to the black/white input image, dropping of the content of the additional image can be prevented.

Also, in order to accept such a case that there is no such an additional image corresponding to a characteristic of an input image, image converting means for converting a characteristic of an additional image may be employed. For instance, while a color additional image is stored in the additional image storage means, when a black/white image is inputted as an input image, the color additional image is converted into a black/white additional image by the image converting means, and then, this converted black/white additional image may be added to the input image. Also, in this case, for example, when the input image is the black/white image, the black/white image can be added to this input image. This is different from the conventional image processing apparatus in which only the additional image is the color image, so that the deterioration of productivity can be avoided.

Otherwise, when an additional image corresponding to the characteristic of the input image is not stored, it is possible to issue such an instruction that this additional image is outputted while having a characteristic corresponding to the characteristic of the input image, and also add the additional image to the input image. For example, while a color additional image is stored in the additional image storage means, when a black/white image is inputted as an input image, the color additional image stored in the additional image storage means is added to the input image in connection with a command for outputting the color additional image as a black/white image. As a consequence, when the image to which the additional image is added is actually outputted, both the input image and the additional image can be outputted as the black/white images. This is different from the conventional image processing apparatus in which only the additional image corresponds to the color image, so that lowering of the productivity can be prevented.

Furthermore, when a charge amount is calculated, as explained above, since the additional image in correspondence with the characteristic of the input image is added, if the charge amount calculation is performed in accordance with the characteristic of the input image, then the charge amount can be calculated in a proper manner. As a consequence, even when the color additional image is added to the black/white image, the charge amount for the user can be handled as the charge amount for the black/white image. Otherwise, the charge amount calculation may be carried out in accordance with the judgment result of the input image by the judging means. Alternatively, the charge amount may be varied, depending upon such a condition as to whether or not the additional image is added.

BRIEF DESCRIPTION OF THE DRAWINGS

FIG. 4 is an explanatory diagram for explaining an example of a charging method employed in the image processing apparatus according to the first embodiment of the present invention;

DETAILED DESCRIPTION OF THE PREFERRED EMBODIMENTS

Now, a description will be given in more detail of preferred embodiments of the invention with reference to the accompanying drawings.

Figure 1:
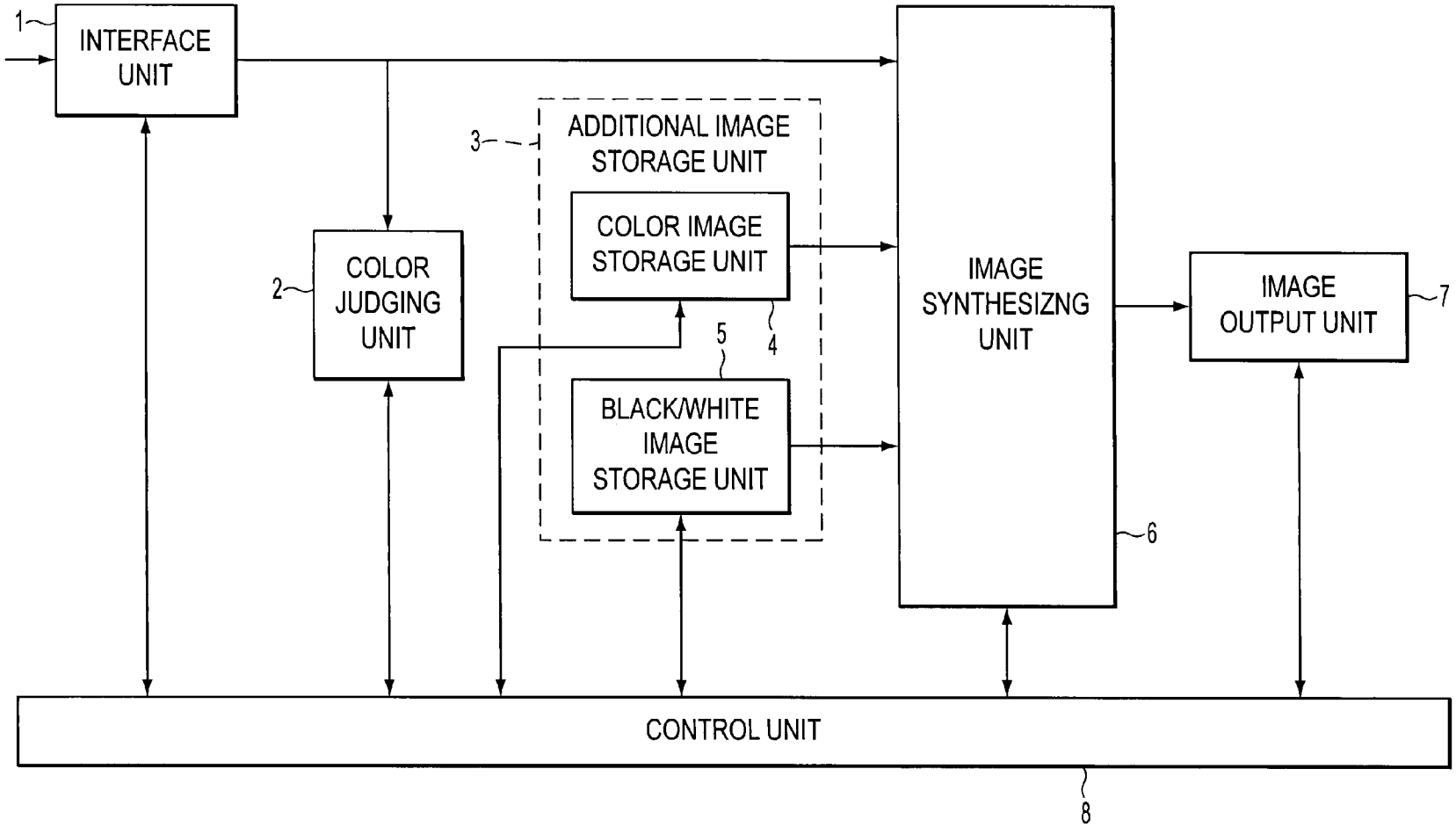
FIG. 1 is a block diagram for showing an image processing apparatus according to a first embodiment of the present invention.

FIG. 1 is a block diagram for indicating an image processing apparatus according to a first embodiment of the present invention. In this drawing, reference numeral 1 shows an interface unit, reference numeral 2 indicates a color judging unit, reference numeral 3 represents an additional image storage unit, reference numeral 4 shows a color image storage unit, and reference numeral 5 demotes a black/white image storage unit. Also, reference numeral 6 shows an image synthesizing unit, reference numeral 7 indicates an image output unit, and reference numeral 8 is a control unit. The interface unit 1 receives an input image which is transferred outside this image processing apparatus. The input image may be realized by, for example, image data represented by a raster format, and other various data such as image data described by a page description language (will be referred to as a "PDL" hereinafter). The input image is supplied to both the color judging unit 2 and the image synthesizing unit 6.

The color judging unit 2 judges as to whether each of output pages is color, or black/white with respect to an input image. When such a portion other than a black/white portion is present even in an output page, this color judging unit 2 can judge that the input image thereof is a color image.

The additional image storage unit 3 can store thereinto one, or more additional images which are added to the input image. In the example of FIG. 1, both the color image storage unit 4 and the black/white image storage unit 5 are provided. In the color image storage unit 4, such an additional image is stored which is outputted in an optimum condition in such a case that an image is outputted in a color mode. Also, in the black/white image storage unit 5, such an additional image is stored which is outputted in an optimum condition in such a case that an image is outputted in a black/white mode. Similar to the input image, as the additional images stored in the color image storage unit 4 and the black/white image storage unit 5, various formats of data such as the raster format and the PDL format may be employed. Alternatively, as to the color image and the black/white image, a plurality of additional images may be stored into the color image storage unit 4 and the black/white image storage unit 5.

The image synthesizing unit 6 owns the following function. That is, in response to a judgment result made by the color judging unit 2, this image synthesizing unit 6 adds to an input image, any one of a color additional image stored in the color image storage unit 4 and a black/white additional image stored in the black/white storage unit 5. For example, in such a case that the color judging unit 2 judges that an inputted image is a color image, the image synthesizing unit 6 can add the color additional image stored in the color image storage unit 4 to this input color image. For example, in such a case that the color judging unit 2 judges that an inputted image is a black/white image, the image synthesizing unit 6 can add the black/white additional image stored in the black/white image storage unit 5 to this input black/white image. Apparently, even when an inputted image is a black/white image, the image synthesizing unit 6 may add the color additional image to this input black/white image. In a process operation for adding an additional image to an input image, for example, when output image data owns the raster format, the input image may be synthesized with the additional image. Also, for instance, when output image data owns the PDL format, such a command may be transferred to the image output unit 7, by which both the input image and the output image are imaged into the same page.

The image output unit 7 forms an image in accordance with such image data obtained by adding an additional image to an input image by the image synthesizing unit 6. Alternatively, the image output unit 7 may output this image data to, for example, an external network. Even when an image is formed in this image output unit 7, and also even when an image is formed via the external network in another apparatus, there are many possibilities that an efficiency is lowered when a color image is formed, as compared with that when a black/white image is formed. However, since the image synthesizing unit 6 adds the additional image to the input image, depending upon such a fact that this input image corresponds to either the color image or the black/white image, for instance, if the black/white additional image is added to the black/white input image, then the black/white image can be formed in a higher efficiency. Thus, lowering of productivity can be suppressed, which is caused by that only the color additional image is added to the black/white input image.

The control unit 8 controls an entire operation of the image processing apparatus. In this case, this control unit 8 also preforms a reading control operation of an additional image with respect to the additional image storage unit 3 in accordance with the judgment result derived from the color judging unit 2, and further, executes an adding control operation of an additional image to an input image in the image synthesizing unit. Alternatively, as apparent from the foregoing description, these control operations may be carried out in the respective units. Furthermore, the control unit 8 may perform a control operation related to a charging operation (charging system). The charging operation may be carried out based upon, for example, a characteristic of an image outputted from the image output unit 7. As an example, this charging operation may be performed, depending upon such a fact that an output image corresponds to either a color image or a black/white image. Alternatively, the charging operation may be carried out based upon a judgment result of a characteristic of an input image judged in the color judging unit 2. For example, this charging operation may be carried out, depending upon such a fact that an input image corresponds to either a color image or a black/white image. Alternatively, the image processing apparatus may be arranged in such a selectable manner as to whether or not an additional image is added from an external source. In response to this instruction, the control unit 8 may control the image synthesizing unit 6. A charge amount calculated in the charging operation may be made different from each other, depending upon such a fact as to whether or not an additional image is added. Furthermore, the image processing apparatus may be alternatively arranged in such a way that a color additional image is always designated as the additional image, or a black/white additional image is always designated as the additional image.

Figure 2:
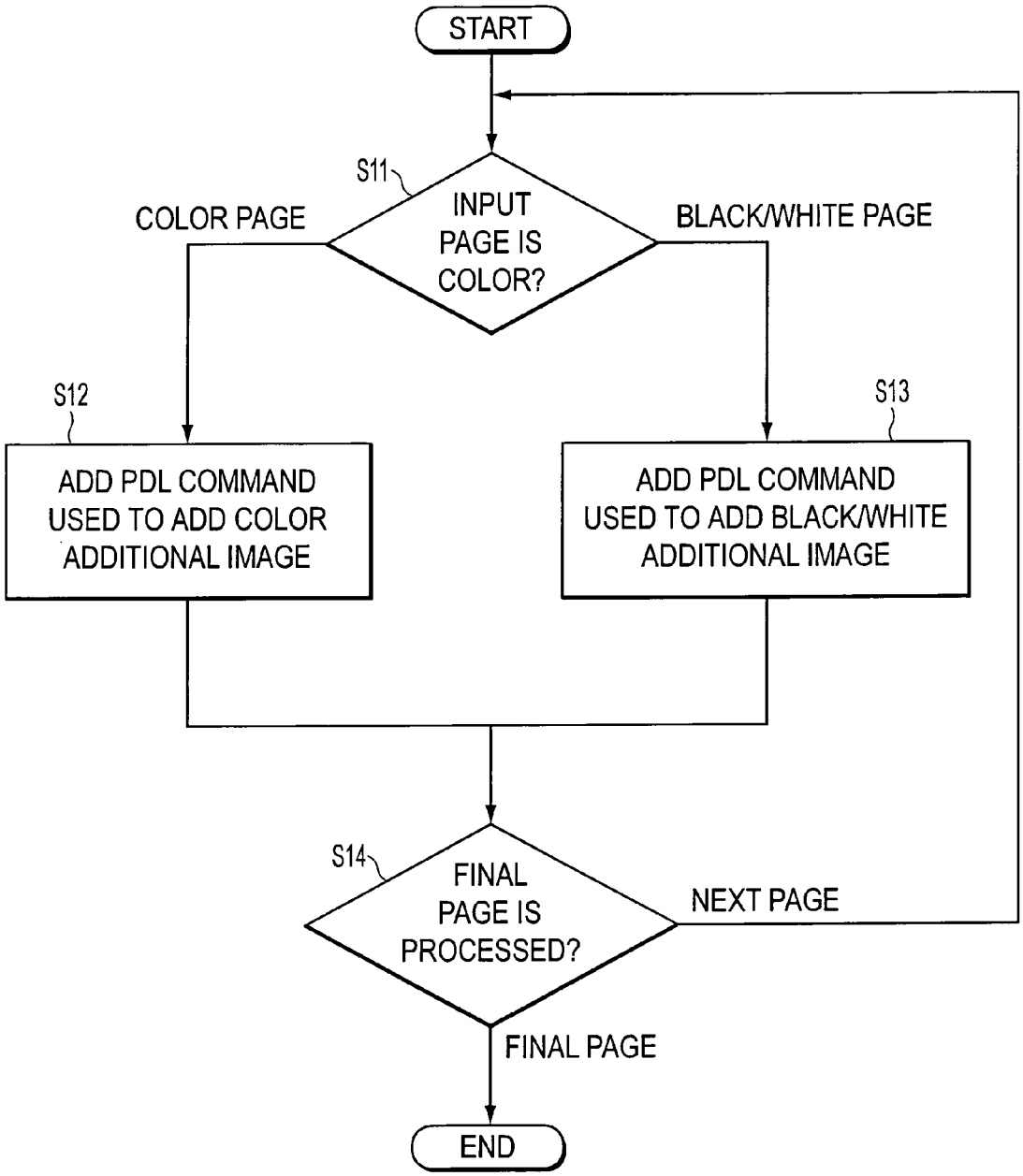
FIG. 2 is a flowchart for describing an example of operation of the image processing apparatus according to the first embodiment of the present invention.

FIG. 2 is a flowchart for describing an example of operations of the above-described image processing apparatus according to the first embodiment of the present invention. In this embodiment, it is so assumed that while an input image described in the PDL format is entered into the interface unit 1, an image outputted (synthesized) from the image synthesizing unit 6 is also data described in the PDL format. Apparently, both the format of the input image and the format of the image outputted from the image synthesizing unit 6 are not limited to the above-explained PDL formats, but also may be the raster formats by which operations of this image processing apparatus are substantially same as these as to the data having the PDL format.

In the flow chart of FIG. 2, when the interface unit 1 receives an input image, the color judging unit 2 judges at a step S11 as to whether of not each of pages of the input image corresponds to a color page, or a black/white page. In the case that the color judging unit 2 judges that this relevant page corresponds to the color page, the image synthesizing unit 6 adds a PDL command to the data of the input image which is described by the PDL format, and then outputs PDL data of an image of this page to the image output unit 7 at a step S12. This PDL command is used to add the color additional image stored in the color image storage unit 4.

On the other hand, in such a case that the relevant page of the input image corresponds to the black/white page which is judged by the color judging unit 2, the image synthesizing unit 6 adds a PDL command to the data of the input image which is described by the PDL format, and then outputs PDL data of an image of this page to the image output unit 7 at a step S13. This PDL command is used to add the black/white additional image stored in the color image storage unit 5.

At a step S14, a check is made as to whether or not pages of the input image up to a final page have been outputted. When the pages up to the final page have not yet been outputted, the process operation is returned to the previous step S11 in order to execute the image processing operation as to the next page. As previously explained, the above-described image processing operation is repeatedly carried out as to all of the pages contained in the input image.

Figure 3A:
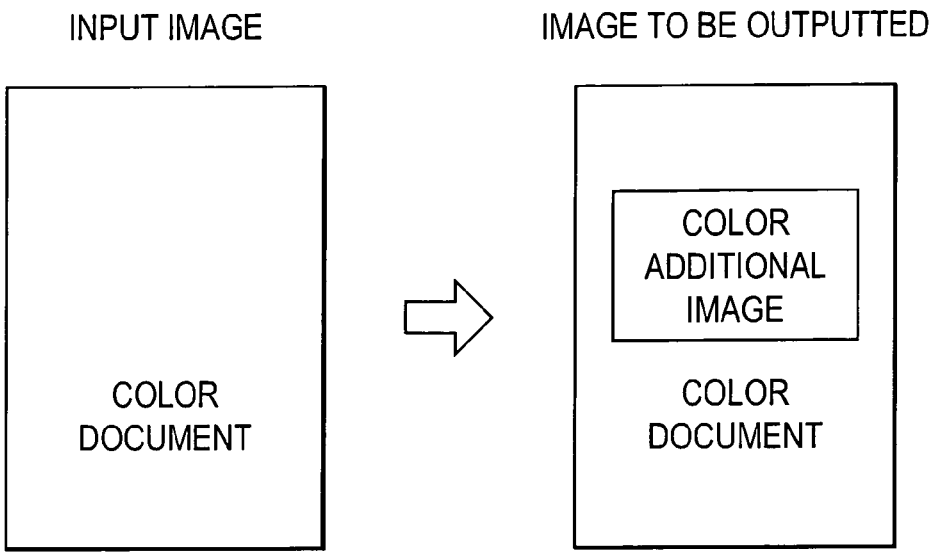
FIGS. 3A and 3B are explanatory diagrams for explaining one example of an input image and an output image in the image processing apparatus according to the first embodiment of the present invention.
Figure 3B:
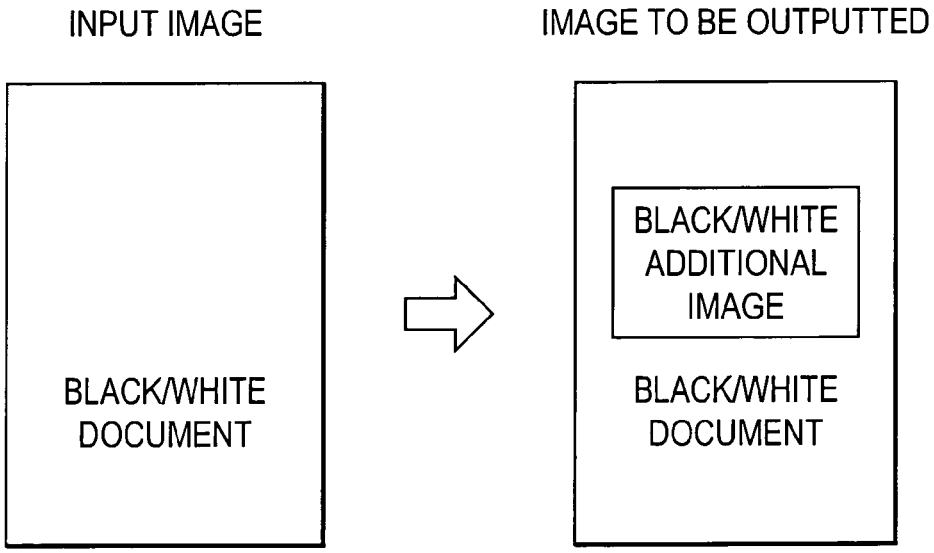

FIGS. 3A and 3B are explanatory diagrams for explaining one example of an input image and an output image in the image processing apparatus according to the first embodiment of the present invention. Since the above-explained operation of the image processing apparatus is carried out, for instance, as indicated in FIG. 3A, in the case that an input image corresponds to a color document, such a document to which a color additional image is added is outputted as an image to be outputted. Also, for instance, as shown in FIG. 3B, in the case that an input image corresponds to a black/white document, such a document to which a black/white additional image is added is outputted as an image to be outputted. It should be that although the additional image is inserted into the upper portion of the document in FIGS. 3A and 3B, this position where the additional image is inserted is arbitrarily selectable.

As previously described, in such a case that the output apparatus is an image forming apparatus such as a printer, a time duration required to form a color image becomes several times longer than a time duration required to form a black/white image. As previously explained, since the black/white additional image is added to the black/white input image, the additional image can be added, while the productivity is not lowered when the black/white image is outputted.

Also, in this first embodiment, since the color additional image and the black/white additional image are separately saved, as represented in FIG. 3A, the present image processing unit is not limited to such a case that the color additional image is added, but also not limited to such a case that the black/white additional image is added (see FIG. 3B). Therefore, the optimum additional image can be added with respect to the black/white image. As a consequence, the following problems can be prevented. That is to say, the image becomes unclear, and also the contents of the image cannot be read, depending upon the color in such an example that the color image is formed in the black/white ink.

FIG. 4 is an explanatory diagram for explaining an example of a charging system employed in the image processing apparatus according to the first embodiment of the present invention. In this example, it is so assumed that a selection can be made as to whether or not an additional image is added to an input image. Also, in this example, a charge amount is made different, depending upon such a fact as to whether an input image corresponds to a color image, or a black/white image. In other words, 4 sorts of charging systems are managed by determining as to whether or not an additional image is added to an input image, and also by checking as to whether an input image corresponds to a color image, or a black/white image. In general, a charge amount required when a color image is outputted in higher than a charge amount required when a black/white image is outputted, for instance, a charge amount "A" is higher than another charge amount "C". Also, assuming now that an advertisement is added as an additional image to form an image, since a charge amount of the added advertisement is shared by an advertisement owner, a charge amount of the output image may be reduced when such an additional image is added. In other words, the charge amount "B" may be made cheaper than the charge amount "A", and also, a charge amount "D" may be made cheaper than the charge amount "C." Apparently, in the case that an additional image such as an advertisement is added, a charge amount may be set to a free charge.

For instance, in FIG. 3A, when a color input image is outputted without adding an additional image, the charge amount "A" is applied, whereas when the additional image is added to the color input image, the charge amount "B" is applied. In this case, since the input image is the color image, the same charge amount is applied even when the additional image corresponds to either the color image or the black/white image. On the other hand, as shown in FIG. 3B, when an input image corresponds to a black/white image, if this input image is directly outputted, then the charge amount "C" is applied. In such a case that an additional image is added to this black/white input image, as previously explained, the black/white image is added thereto. As a result, an output image becomes a black/white image, so that the charge amount "D" is applied. Since there is no such a conventional problem that the color additional image is mistakenly added to the black/white input image, the below-mentioned charging problem never occurs. That is, since the color additional image is not added to the black/white input image in this embodiment, the charge amount as to the color additional image is not requested.

It should also be noted that FIG. 4 indicates such an example where the charge amount is classified into 4 sorts of charge amounts "A" to "D", the present invention is not limited to this charge amount classification. For example, while a total color number of an input image is detected, for example, if only two colors (red and black colors) are used in this input image, a charge amount specific to such a two-color image may separately defined. Alternatively, charge amounts may be made different from each other, depending upon a total number of additional images to be added.

In the example shown in FIG. 4, the charge amount is selected based upon such a fact as to whether the input image is the color image, or the black/white image. Alternatively, the charging system may be carried out in a similar manner. That is, as shown in FIGS. 3A and 3B, in the case that when the input image is the color image, the color additional image is added to this input image, whereas when the input image is the black/white image, the black/white additional image is added, the charge amount may be selected, depending upon such a fact as to whether the image outputted from either the image synthesizing unit 6 or the image output unit 7 corresponds to either the color image or the black/white image.

Figure 5A:
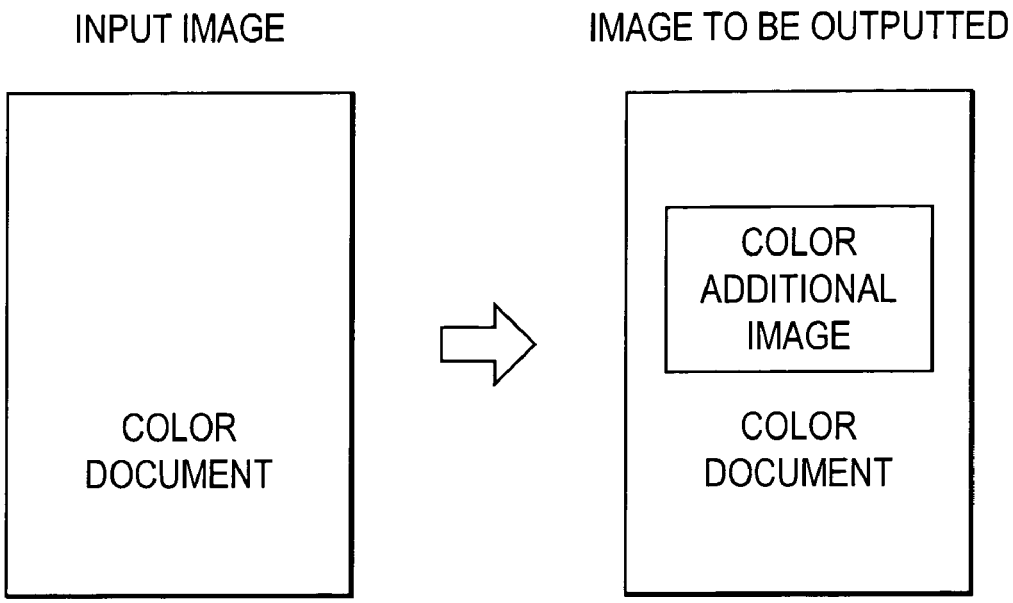
FIGS. 5A and 5B are explanatory diagrams for explaining another example of an input image and an output image in the image processing apparatus according to the first embodiment of the present invention.
Figure 5B:
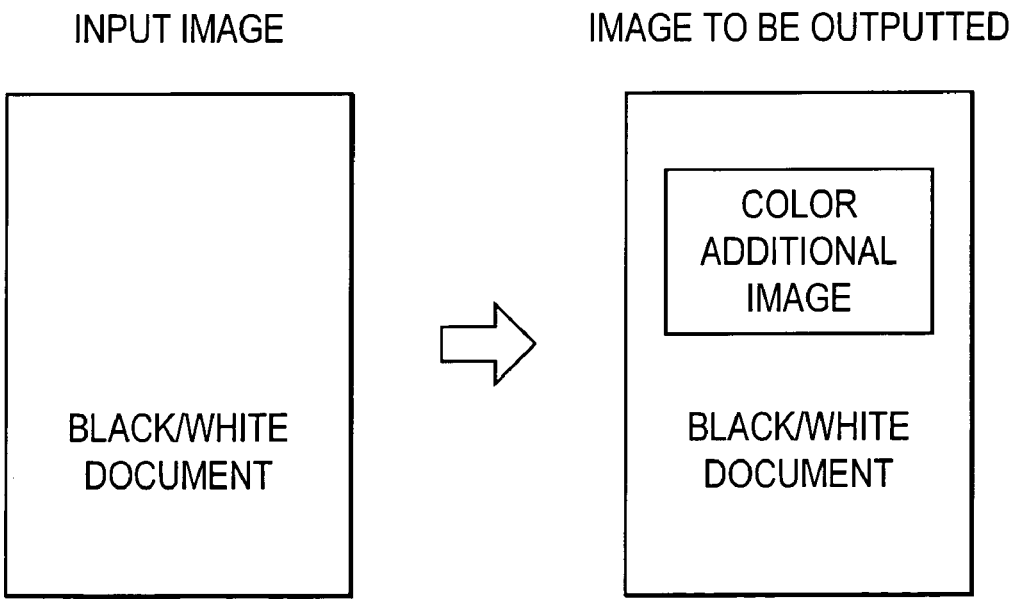

FIGS. 5A and 5B are explanatory diagrams for explaining another example of an input image and an output image in the image processing apparatus according to the first embodiment of the present invention. In the above explanation, if the input image corresponds to the black/white image, then the black/white additional image is added to this black/white input image. However, for instance, the following case may be conceived due to an intention of an advertisement owner. That is, as to the additional image, a color additional image must be always added to an input image. In other words, similar to FIGS. 3A and 3B, in such a case that an input image is a color image, a color additional image is added to this color input image as represented in FIG. 5A. Even when an input image is a black/white image, a color additional image is added to this black/white image, as shown in FIG. 5B. For instance, such an alternative operation may be conceived in the case that while the output apparatus is the color output apparatus and the black/white output apparatus, the output speeds are not varied.

In such an alternative case, even when an input image is a black/white image, an image outputted from the image synthesizing unit 6 becomes a color image. However, as shown in FIG. 4, since the charge amount is selected based upon such a fact as to whether the input image corresponds to the color image, or the black/white image, even in such a case that while the input image is the black/white image, the color additional image is added to this black/white image similar to the above case, the charge amount may be determined as the black/white image. As previously explained, since the charge amount is selected by checking as to whether the input image corresponds to the color image, or the black/white image, this image processing apparatus can provide such a charge system which is very useful for users.

Figure 6:
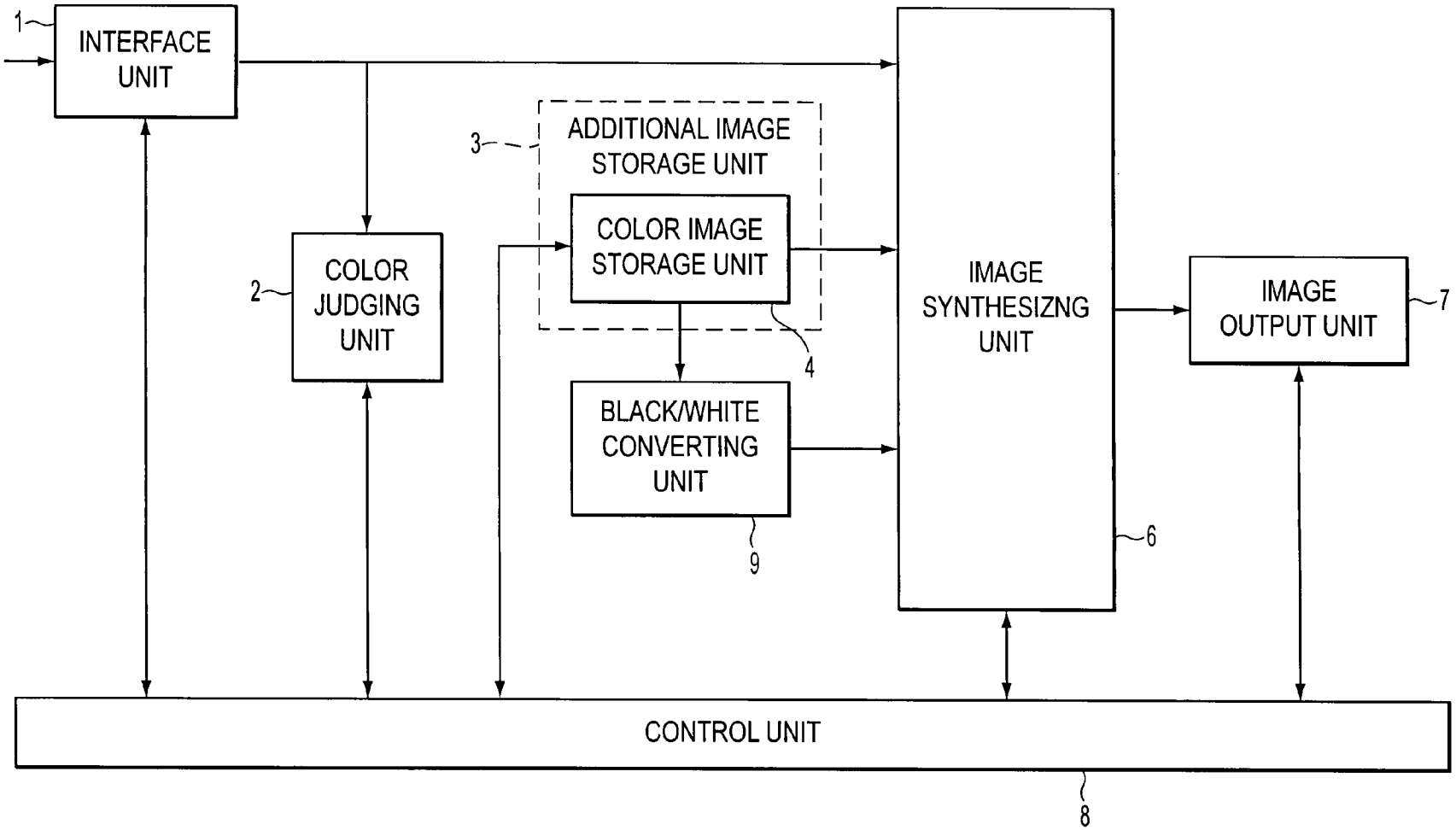
FIG. 6 is a block diagram for showing an image processing apparatus according to a second embodiment of the present invention.

FIG. 6 is a schematic block diagram for showing an image processing apparatus according to a second embodiment of the present invention. It should be understood that the same reference numerals shown in FIG. 1 will be employed as those for indicating the same, or similar structural units of FIG. 6, and therefore, explanations thereof are omitted. Reference numeral 9 indicates a black/white converting unit 9. In this second embodiment, the black/white image storage unit 5 is not provided with the additional image storage unit 3, and such an example is indicated. That is, with respect to a black/white input image, an additional image corresponding to this input image is not stored in the additional image storage unit 3.

The black/white converting unit 9 converts a color additional image stored in the color image storage unit 4 into a black/white additional image. In response to a judgment result made by the color judging unit 2, the image synthesizing unit 5 adds to an input image, any one of the color additional image stored in the color image storage unit 4 and the additional image which is converted into the black/white additional image by the black/white converting unit 9.

Figure 7:
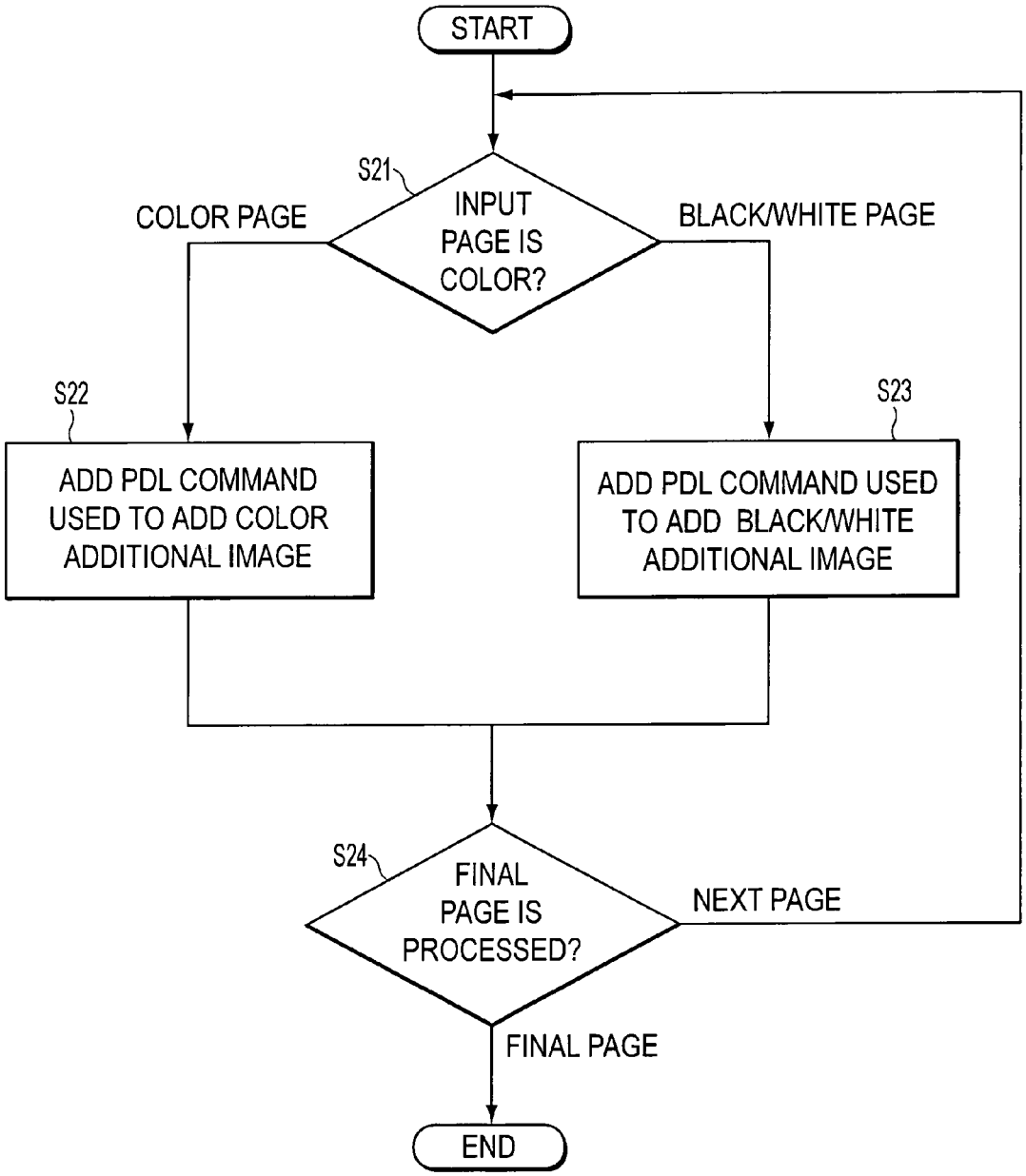
FIG. 7 is a flow chart for describing an example of operation of the image processing apparatus according to the second embodiment of the present invention.

FIG. 7 is a flowchart for explaining an example of operations of the image processing apparatus according to the second embodiment of the present invention. In this second embodiment, it is so assumed that while an input image described in the PDL format is entered into the interface unit 1, an image outputted (synthesized) from the image synthesizing unit 6 is also data described in the PDL format. Apparently, both the format of the input image and the format of the image outputted from the image synthesizing unit 6 are not limited to the above-explained PDL formats, but also may be the raster formats by which operations of this image processing apparatus are substantially same as these as to the data having the PDL format.

In the flow chart of FIG. 7, when the interface unit 1 receives an input image, the color judging unit 2 judges at a step S21 as to whether of not each of pages of the input image corresponds to a color page, or a black/white page. In the case that the color judging unit 2 judges that this relevant page corresponds to the color page, the image synthesizing unit 6 adds a PDL command to the data of the input image which is described by the PDL format, and then outputs PDL data of an image of this page to the image output unit 7 at a step S12. This PDL command is used to add the color additional image stored in the color image storage unit 4.

On the other hand, in such a case that the relevant page of the input image corresponds to the black/white page which is judged by the color judging unit 2, the image synthesizing unit 6 receives the black/white additional image from the black/white converting unit 9 at a step S23. This black/white additional image is produced in such a manner that the color additional image stored in the color image storage unit 4 is converted into the black/white image in the black/white converting unit 9. Then, this image synthesizing unit 6 adds such a PDL command to the data of the input image written by the PDL format, and then outputs PDL data of an image of this page to the image output unit 7. This PDL command is used to add the received black/white additional image.

At a step S24, a check is made as to whether or not pages of the input image up to a final page have been outputted. When the pages up to the final page have not yet been outputted, the process operation is returned to the previous step S21 in order to execute the image processing operation as to the next page. As previously explained, the above-described image processing operation is repeatedly carried out as to all of the pages contained in the input image.

Since the above-explained operation of this image processing apparatus according to the second embodiment is carried out, for instance, as shown in FIGS. 3A and 3B, the color additional image is added with respect to the color input image, whereas the additional image which is converted into the black/white additional image is added with respect to the black/white input image. As a consequence, even when a time duration required to form a color image becomes several times longer than a time duration required to form a black/white image, since the black/white additional image is added to the black/white input image, the additional image can be added, while the productivity is not lowered when the black/white image is outputted. As apparent from the foregoing description, in the case that a time duration required to form a color image is not made different from a time duration required to form a black/white image, as shown in FIGS. 5A and 5B, a color additional image may be added to a black/white input image.

It should also be noted that since the charging system control operation of the second embodiment can be carried out in a similar manner to that of the first embodiment, descriptions thereof are omitted in this embodiment.

Figure 8:
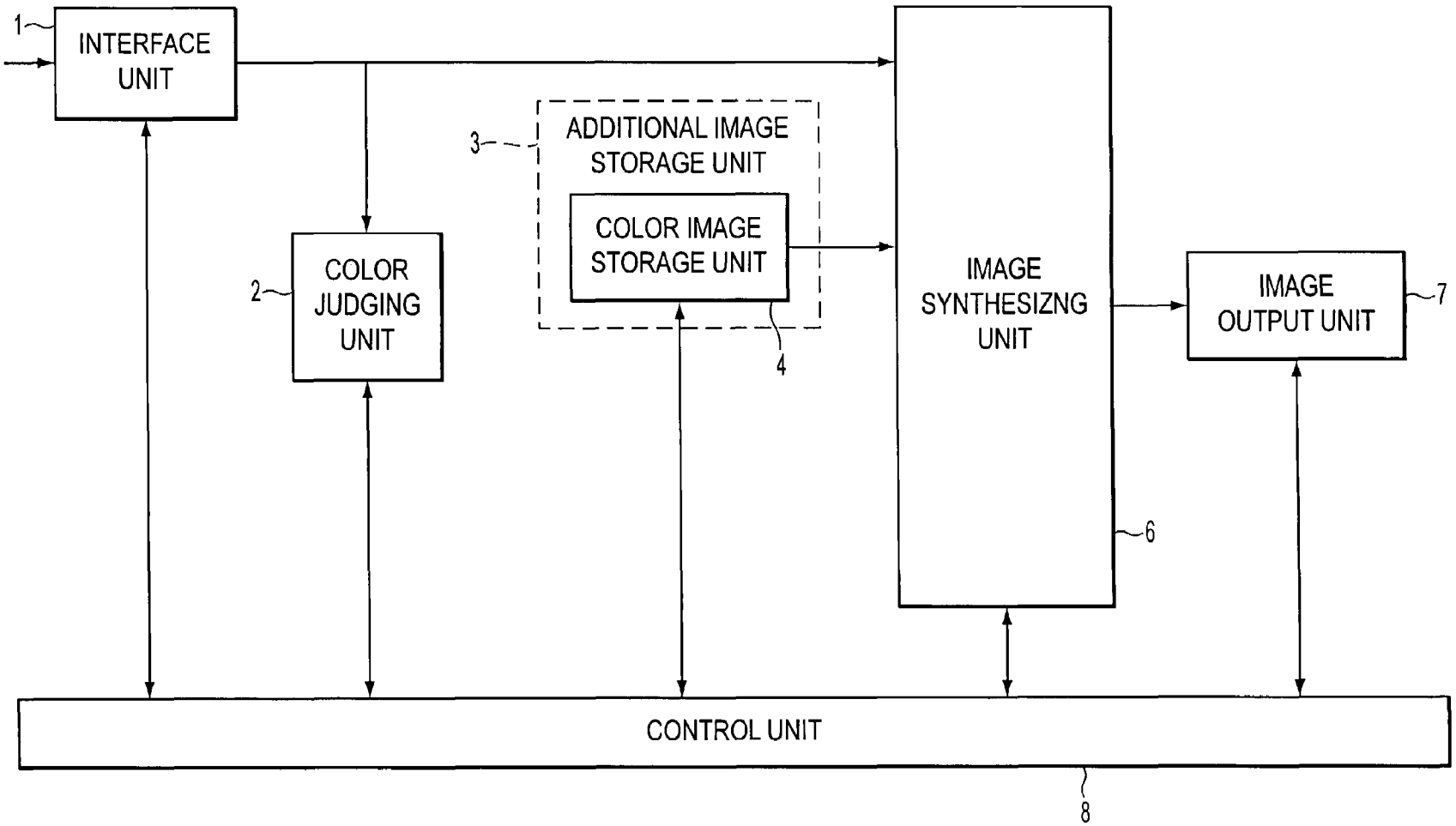
FIG. 8 is a block diagram for showing an image processing apparatus according to a third embodiment of the present invention.

FIG. 8 is a schematic block diagram for showing an image processing apparatus according to a third embodiment of the present invention. It should be understood that the same reference numerals shown in FIG. 1 will be employed as those for indicating the same, or similar structural units of FIG. 8, and therefore, explanations thereof are omitted. Similar to the above-described second embodiment, in this third embodiment, the black/white image storage unit 5 is not provided with the additional image storage unit 3, and such an example is indicated. That is, with respect to a black/white input image, an additional image corresponding to this input image is not stored in the additional image storage unit 3. Also, the image processing apparatus, according to the third embodiment, may become effective in such a case that an input image described in the PDC format is entered into the interface unit 1, and furthermore, an image outputted from the image synthesizing unit 6 is similarly data described in the PDL format.

In this third embodiment, the image synthesizing unit 6 switches one instruction and another instruction in response to a judgment result obtained by the color judging unit 2 as a PDL command by which a color additional image stored in the color image storage unit 4 is added to an input image. In one instruction, such a command for adding a color additional image is added to the input image. In another instruction, such a command for adding a black/white additional image is added to the input image. As a result, for example, when an image described in the PDL format is interpreted in either the image output unit 7 or an externally-provided image forming apparatus, either the color additional image or the black/white input image is added to this input image in response to the PDL command.

Figure 9:
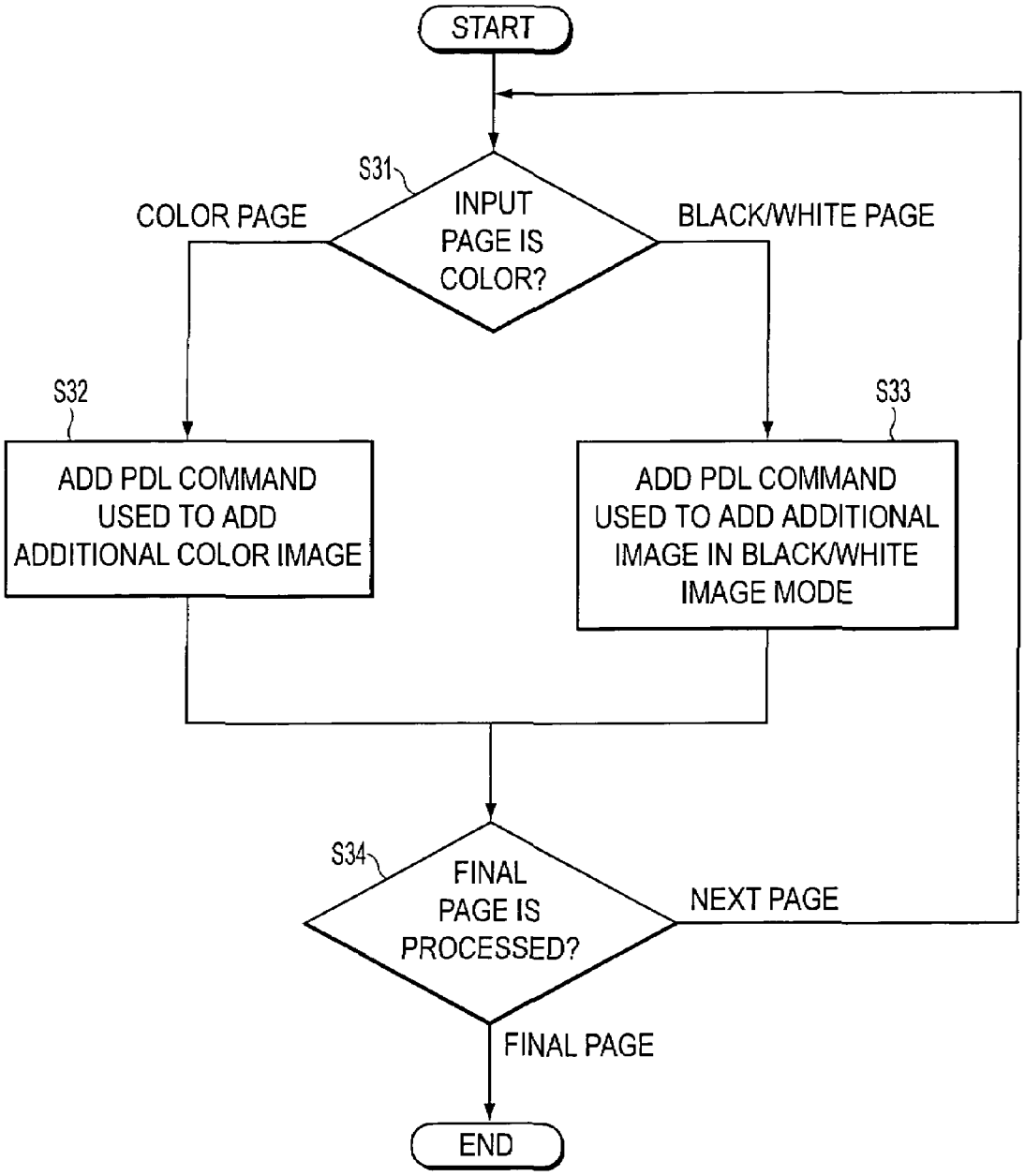
FIG. 9 is a flow chart for describing an example of operation of the image processing apparatus according to the third embodiment of the present invention.

FIG. 9 is a flowchart for describing an example of operations of the above-described image processing apparatus according to the third embodiment of the present invention. In the flow chart of FIG. 9, when the interface unit 1 receives an input image, the color judging unit 2 judges at a step S31 as to whether of not each of pages of the input image corresponds to a color page, or a black/white page. In the case that the color judging unit 2 judges that this relevant page corresponds to the color page, the image synthesizing unit 6 adds a PDL command to the data of the input image which is described by the PDL format, and then outputs PDL data of an image of this page to the image output unit 7 at a step S32. This PDL command is used to add the color additional image stored in the color image storage unit 4.

On the other hand, in such a case that the relevant page of the input image corresponds to the black/white page which is judged by the color judging unit 2, the image synthesizing unit 6 adds a PDL command to the data of the input image which is described by the PDL format, and then outputs PDL data of an image of this page to the image output unit 7 at a step S33. This PDL command is used to add the black/white additional image stored in the color image storage unit 5.

At a step S34, a check is made as to whether or not pages of the input image up to a final page have been outputted. When the pages up to the final page have not yet been outputted, the process operation is returned to the previous step S31 in order to execute the image processing operation as to the next page. As previously explained, the above-described image processing operation is repeatedly carried out as to all of the pages contained in the input image.

When the image having the PDL format is interpreted which is produced by executing the above-explained operation of the image processing apparatus according to the third embodiment, for example, as shown in FIGS. 3A and 3B, the color additional image is added with respect to the color input image, whereas the additional image which is converted into the black/white additional image is added with respect to the black/white input image. As a consequence, even when a time duration required to form a color image becomes several times longer than a time duration required to form a black/white image, since the black/white additional image is added to the black/white input image, the additional image can be added, while the productivity is not lowered when the black/white image is outputted. As apparent from the foregoing description, in the case that a time duration required to form a color image is not made different from a time duration required to form a black/white image, as shown in FIGS. 5A and 5B, a color additional image may be added to a black/white input image.

It should also be noted that since the charging system control operation of the second embodiment can be carried out in a similar manner to that of the first embodiment, descriptions thereof are omitted in this embodiment.

In the above-described first to third embodiment, such an example is described. That is, either the color additional image or the black/white additional image is added, depending upon such a fact as to whether the input image corresponds to the color image, or the black/white image. As previously explained in the charging system, for example, the charge amounts may be made different from each other, and also the image forming durations may be made different from each other by forming either an image in two colors or an image in three colors. In such an alternative case, while additional images corresponding to these images are stored in the additional image storage unit 3, converting units are employed in accordance with these arrangements. Otherwise, the PDL command may be added, by which the relevant images may be formed. In the case that there are many sorts of additional images, several additional images are previously prepared, whereas when there is no corresponding additional image, the additional image stored in the additional image storage unit 3 may be converted into such a desirable additional image similar to the second embodiment mode. Alternatively, a PDL command may be added so as to output the relevant additional image similar to the third embodiment mode.

Also, in the above-described example, while the color is considered as one of the characteristics of the input image, the corresponding additional image is added to the input image. However, the present invention is not limited to this example, but may be applied to other examples. For example, as the characteristic of the input image, the corresponding additional images may be added to the input images with respect to each of various characteristics such as resolution, and drawing objects, i.e., a text and an image. Also, the corresponding additional images may be added to the input images with respect to each combination of plural characteristics. Apparently, as to the charging system, the charge amounts may be calculated in response to these characteristics. For example, when a test printing operation with low resolution is carried out, a charge amount may be set to low cost, whereas when a printing operation with a high image quality is carried out, a charge amount may be set to high cost. This charge amount setting operation is determined by checking as to whether or not an additional image is added to an input image.

As apparent from the foregoing description, since the additional image can be added to the input image in correspondence with the characteristic of this input image, the image processing apparatus of the present invention can output the image in the following manner, while productivity during the image output operation is not lowered. That is, for example, when the time duration required to form the black/white image is different from the time duration required to form the color image, the additional images fitted to the respective characteristics may be added to the input image. Also, since the additional images fitted to the respective characteristics are prepared, such a problem can be prevented. That is, for example, a color additional image is outputted as a black/white image, so that a content of this color additional image is dropped.

Furthermore, even when the charging system is carried out, since the additional image fitted to the characteristic of the input image is added, such a problem can be avoided, so that the proper charging system can be achieved. That is, for instance, although the input image is the black/white image, since the additional image is only the color additional image, the charge amount for the color input image is mistakenly calculated. In accordance with the present invention, there is such an effect that the image processing apparatus capable of giving usabilities to the users can be provided.

What is claimed is:

1. An image processing apparatus comprising:

an image storage memory that stores [one or more] additional images;

a judging unit that judges a [characteristic] *plurality of characteristics* of an input image; and a synthesizing unit that selects [the] *a plurality of* additional [image] *images* from the [image] *stored additional images in the* storage memory based on the [characteristic] *plurality of characteristics* of the input image judged by the judging unit and adds the *selected plurality of* additional [image] *images* to the input image,

*wherein at least one image of the selected plurality of additional images is added to the input image with respect to each characteristic of the plurality of characteristics*.

2. The image processing apparatus as claimed in claim 1, wherein said image storage memory stores *for each stored additional image* both a color additional image and a black/white additional image as said *stored* additional image;

wherein said judging unit judges whether said input image corresponds to a color input image, or a black/white input image; and wherein said synthesizing unit adds said color additional image to said input image when said judging unit judges that said input image is the color input image, and also adds said black/white additional image to said input image when said judging unit judges that said input image is the black/white image.

[3. The image processing apparatus as claimed in claim 1, further comprising:

an image converter that converts a characteristic of an additional image; and wherein when an additional image corresponding to the characteristic of said input image is not stored into said image storage memory, said image converter converts the additional image stored in said image storage memory into an additional image having a characteristic in response to the characteristic of said input image.]

[4. The image processing apparatus as claimed in claim 3, wherein said image storage memory stores a color additional image as said additional image;

wherein said image converter converts the color additional image stored in said image storage memory into a black/white additional image; and wherein when said judging unit judges that said input image is a color image, said synthesizing unit adds the color additional image stored in said image storage memory to said input image, whereas when said judging unit judges that said input image is a black/white image, said synthesizing unit adds said black/white additional image converted by said image converter to said input image.]

[5. The image processing apparatus as claimed in claim 1, wherein when an additional image corresponding to the characteristic of said input image is not stored into said image storage memory, said synthesizing unit issues such an instruction that the additional image stored in said image storage memory is outputted while having a characteristic corresponding to the characteristic of said input image; and also adds said additional image to said input image.]

[6. The image processing apparatus as claimed in claim 5, wherein said image storage memory stores a color additional image as said additional image; and wherein when said judging unit judges that said input image is a black/white image, said synthesizing unit adds the color additional image stored in the image storage memory to said input image in connection with a command for outputting the color additional image as a black/white image.]

[7. The image processing apparatus as claimed in claim 1, further comprising:

a charging unit to calculate a charge amount in response to a characteristic of an output image.]

[8. The image processing apparatus as claimed in claim 7, wherein when said judging unit judges that the characteristic of said input image is the characteristic of the black/white image, said charging unit calculates the charge amount for the black/white image, assuming that the characteristic of said output image corresponds to the characteristic of the black/white image.]

[9. The image processing apparatus as claimed in claim 7, wherein said synthesizing unit is capable of selectively determining as to whether or not said additional image is added to the input image; and said charging unit is capable of varying a charge amount, depending upon such a fact as to whether or not said additional image is added to the input image.]

10. The image processing apparatus as claimed in claim 1, further comprising:

a charging unit for calculating a charge amount in accordance with the [characteristic] *plurality of characteristics* of said input image [which is] *that are* judged by said judging unit.

[11. An image processing method comprising:

storing one or more additional images;

judging a characteristic of an input image; and selecting the additional image based on the characteristic of the input image; and adding the additional image to the input image.]

[12. The image processing method as claimed in claim 11, wherein both a color additional image and a black/white additional image are stored as said additional image;

wherein said judging the characteristic of the input image includes judging whether said input image corresponds to a color input image, or a black/white input image; and wherein said color additional image is added to said input image when said input image is judged as the color input image, and also adds said black/white additional image to said input image when said input image is judged as the black/white image.]

[13. The image processing method as claimed in claim 11, further comprising:

converting a characteristic of an additional image; and wherein when an additional image corresponding to the characteristic of said input image is not being stored, the additional image that is stored is converted into an additional image having a characteristic in response to the characteristic of said input image.]

[14. The image processing method as claimed in claim 13, wherein a color additional image is stored as said additional image;

wherein the color additional image that is stored is converted into a black/white additional image; and wherein when said input image is judged as a color image, the color additional image that is stored is added to said input image, whereas when said input image is judged as a black/white image, said black/white additional image is added to said input image.]

[15. The image processing method as claimed in claim 11, wherein when an additional image corresponding to the characteristic of said input image is not being stored, the additional image that is stored is outputted while having a characteristic corresponding to the characteristic of said input image; and said outputted additional image is added to said input image.]

[16. The image processing method as claimed in claim 15, wherein a color additional image is stored as said additional image; and wherein when said input image is judged as a black/white image, the color additional image is added to said input image in connection with a command for outputting the color additional image as a black/white image.]

[17. The image processing method as claimed in claim 11, further comprising:

calculating a charge amount in response to a characteristic of an output image.]

[18. The image processing method as claimed in claim 17, wherein when the characteristic of said input image is judged as the characteristic of the black/white image, the charge amount is calculated for the black/white image, assuming that the characteristic of said output image corresponds to the characteristic of the black/white image.]

[19. The image processing method as claimed in claim 17, wherein said adding an additional image includes selectively determining as to whether or not said additional image is added to the input image; and said calculating a charge amount includes varying a charge amount, depending upon such a fact as to whether or not said additional image is added to the input image.]

[20. The image processing method as claimed in claim 11, further comprising:

calculating a charge amount in accordance with the characteristic of said input image as judged.]

*21. An image processing apparatus comprising:*

*an image storage memory that stores additional images;*

*a judging unit that judges a plurality of characteristics of an input image; and*

*a synthesizing unit that selects one or more additional images from the additional images stored in the image storage memory based on the plurality of characteristics of the input image judged by the judging unit and adds the one or more additional images to the input image,*

*wherein the one or more additional images is added to the input image with respect to each of the plurality of characteristics.*

*22. An image processing apparatus comprising:*

*an image storage memory that stores additional images;*

*a judging unit that judges one or more characteristics of an input image; and*

*a synthesizing unit that selects a plurality of additional images from the additional images stored in the image*

*storage memory based on the one or more characteristics of the input image judged by the judging unit and adds the plurality of additional images to the input image,*

*wherein the plurality of additional images are added to the input image with respect to the one or more characteristics.*

*23. The image processing apparatus as claimed in claim 1, further comprising:*

*an image converter configured to convert a characteristic of an additional image among the additional images; and*

*wherein when the image storage memory does not contain among the additional images an additional image corresponding to a characteristic among the plurality of characteristics of said input image, said image converter converts an additional image among the additional images stored in said image storage memory into an additional image having a characteristic in response to one of the characteristics of said input image.*

* * * * *